Dec. 8, 1970 J. F. MONAHAN 3,546,602

BURST FLAG GENERATOR

Filed Oct. 18, 1968

INVENTOR
John F. Monahan
BY Eugene M. Whitacre
ATTORNEY 3,546,602
Patented Dec. 8, 1970

3,546,602

BURST FLAG GENERATOR

John F. Monahan, Moorestown, N.J., assignor to RCA Corporation, a corporation of Delaware Filed Oct. 18, 1968, Ser. No. 768,769
Int. Cl. H03b *1/00*
U.S. Cl. 328—139 11 Claims

ABSTRACT OF THE DISCLOSURE

In the NTSC color television system a burst of eight or more cycles of the color subcarrier frequency is included in the transmitted signal following each horizontal line synchronizing pulse. This burst is suppressed during vertical blanking intervals. Apparatus is provided for deriving burst "flag" pulses from differentiated horizontal synchronizing pulses and for inhibiting the burst flag pulses during vertical blanking intervals by deriving an inhibiting waveform from integrated vertical synchronizing pulses.

BACKGROUND OF THE INVENTION

This invention relates to apparatus for generating a burst flag pulse which is used for adding an intermittent reference subcarrier to a composite color television signal in the color encoder portion of a television transmission system.

In the NTSC system of color television transmission, a burst of eight or more cycles of a color subcarrier is transmitted on a pedestal portion of the composite television signal following each horizontal line synchronizing pulse. The subcarrier burst is used in a television receiver to synchronize an oscillator which operates at the color subcarrier frequency, the oscillator being arranged to produce a continuous reference subcarrier wave for demodulating color information contained in sidebands of a modulated suppressed subcarrier color signal. The standards for such color transmission are well known and are set forth in FCC Public Notice No. 53–1663 dated Dec. 17, 1953.

In the transmitting portion of the television system, a burst flag pulse is generated following each horizontal (line) synchronizing pulse but is omitted during the vertical blanking period. During a vertical blanking period, a serrated vertical synchronizing pulse and equalizing pulses, the serrations and equalizing pulses occurring at twice the horizontal line synchronizing pulse frequency, are generated. It is known in the art that the horizontal synchronizing pulses, the equalizing pulses and the vertical synchronizing pulse components may be applied to a gating network including multivibrator stages to generate the burst flag pulses and to inhibit the burst flag pulses during the vertical blanking period. However, the number of stages required to generate and inhibit the burst flag pulses in this manner requires complex and undesirably costly circuitry.

Accordingly, it is an object of this invention to provide improved apparatus for generating burst flag pulses from a train of pulses including horizontal synchronizing pulses, equalizing pulses and vertical synchronizing pulses.

In accordance with the present invention, improved apparatus is provided in a television system for deriving a burst flag pulse from a train of pulses including horizontal line synchronizing pulses, equalizing pulses and vertical synchronizing pulses. Separate means are provided for differentiating and for integrating the train of pulses described above. The outputs of the differentiating and integrating means are combined and coupled to an amplitude detector which generates a burst flag pulse following each horizontal synchronizing pulse and which inhibits the burst flag pulse during the vertical blanking period.

The invention is more fully described in the following specification taken in conjunction with the accompanying drawings in which.

DESCRIPTION OF THE INVENTION

Figure 1:
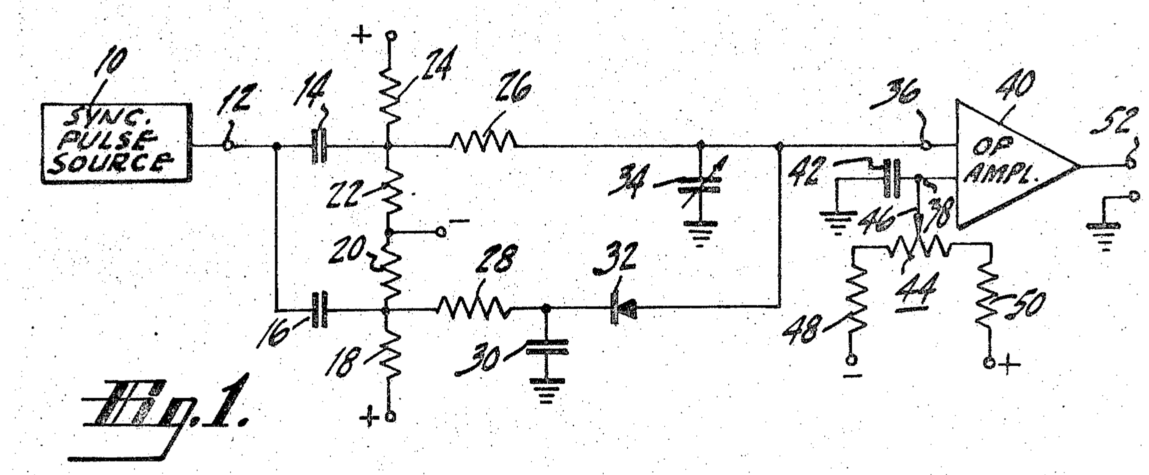
FIG. 1 is a schematic and block diagram of an embodiment of the invention.

In the circuit of FIG. 1, an input terminal 12 is adapted to be coupled to a synchronizing pulse train source 10, the pulse train including recurring horizontal line synchronizing pulses, equalizing pulses, and vertical synchronizing pulses. Such a pulse train is shown in waveform 70*a* of FIG. 2. A first capacitor 14 is coupled between input terminal 12 and the junction of first and second resistors 22 and 24. Resistors 22 and 24 are connected in series in the named order between negative (—) and positive (+) voltage sources.

A second capacitor 16 is coupled between input terminal 12 and the junction of third and fourth resistors 18 and 20. Resistors 18 and 20 are coupled in the named order between the positive and negative voltage sources mentioned above.

A resistor 26 is connected from the junction of resistors 22 and 24 to an input terminal 36 of an operational amplifier 40. A variable capacitor 34 is connected between terminal 36 and ground.

A resistor 28 is connected from the junction of resistors 18 and 20 to the cathode of a diode 32. The anode of diode 32 is connected to terminal 36 of amplifier 40. An integrating capacitor 30 is connected from the junction of resistor 28 and diode 32 to ground.

A biasing network comprising series-connected resistors 50, 44, and 48 is adapted to be connected between positive (+) and negative (—) voltage sources. A wiper arm 46 of variable resistor 44 is connected to a bias input terminal 38 of operational amplifier 40. A decoupling capacitor 42 is connected between terminal 38 and ground.

An output signal from the amplifier 40 is developed between an output terminal 52, and ground.

Figure 2:
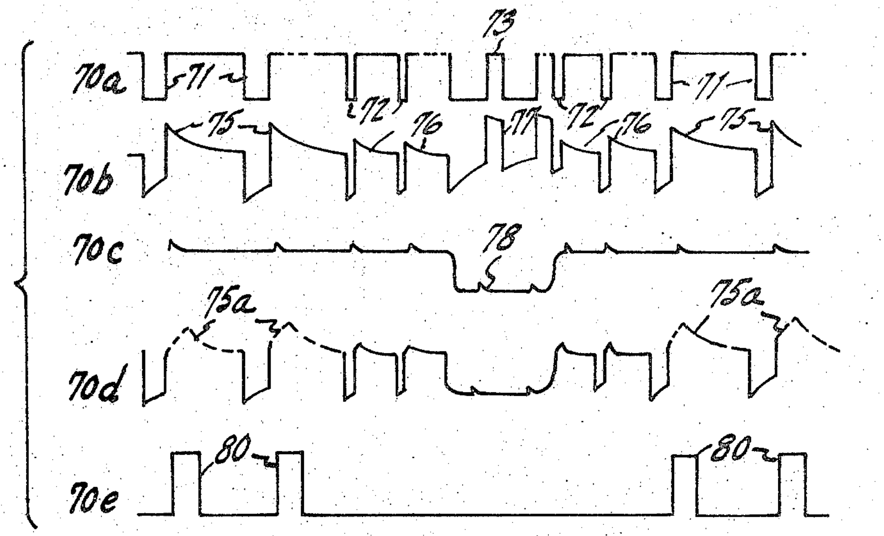
FIG. 2 is a series of diagrams of related pulse waveforms produced at specified points in FIG. 1.

During operation of the burst flag generator shown in FIG. 1, the synchronizing pulse train shown in waveform 70*a* of FIG. 2, which comprises horizontal synchronizing pulses 71, equalizing pulses 72, and serrated vertical synchronizing pulses 73, is applied via terminal 12 to a differentiating network including capacitor 14 and resistors 22 and 24. The relative values of resistors 22 and 24 and the positive and negative supply voltages (+ and —) determine the DC voltage level at the junction of resistors 22 and 24. The DC voltage level is selected such that the output waveform produced at the junction of resistors 22 and 24 is always negative. The effect of the differentiating network 14, 22, 24 on the horizontal synchronizing pulses, the equalizing pulses, and the serrated vertical synchronizing pulses, respectively, may be seen in waveform 70*b* of FIG. 2 by referring to respective differentiated pulses 75, 76, and 77. The amplitudes of each of the three types of pulses 71, 72, 73 are equal while their durations differ. Capacitor 14 serves to pass the leading edge of the waveform (i.e., a high frequency change) but begins to charge to the peak voltage of the pulse immediately thereafter. The output voltage produced at the junction of resistors 22 and 24 therefore declines during the pulse interval (i.e., between the pulse leading and trailing edges). Since the horizontal synchronizing pulses are approximately twice the duration of the equalizing pulses, capacitor 14 is charged to a greater voltage level during the horizontal synchronizing pulses than during the equalizing pulses.

Therefore, at the termination (trailing edge) of the horizontal synchronizing pulses, the output waveform **70*b* returns to a more positive (or, as the case may be, a less negative) voltage than in the case of the equalizing pulses (compare pulses 75 and 76). In this manner the trailing edges of the horizontal synchronizing pulses are susceptible of amplitude separation from the trailing edges of the equalizing pulses. It should be noted that the vertical synchronizing pulse is broken up or serrated and includes relatively long duration components separated by short duration intervals. The long duration or wide components of the vertical synchronizing pulses are greater in duration than either the horizontal synchronizing pulses or the equalizing pulses. Therefore, the trailing edges of the wide vertical synchronizing pulse components will produce the highest positive peaks as shown by pulses 77 of waveform 70*b* of FIG. 2. It will be shown subsequently how the peaks of pulses 77 are brought below the peaks of the other pulses so that the pulses 75** provide the most positive or, if desired, by changing the DC level, the least negative peak voltage.

The pulse waveform **70*a* applied to terminal 12 is also coupled through coupling capacitor 16 and applied to the integrating network including resistor 28 and capacitor 30 (capacitor 16 is substantially larger in value than capacitor 14). The relative values of resistors 18 and 20 and the magnitude of the supplied voltages determine the DC voltage level at the junction of resistors 18 and 20. The time constant of the integrating network 28, 30 is long relative to the time constant of the differentiating network 14, 22, 24 previously described. The width or duration of the vertical synchronizing pulse components 73 is greater than the width of either the horizontal synchronizing pulses or the equalizing pulses. Because of the relatively long time constant of the integrating network 28, 30, capacitor 30 will not be charged significantly by the narrow horizontal synchronizing pulses 71 and equalizing pulses 72, but will be charged by the relatively wide vertical synchronizing pulse components 73 so as to assume a DC level during the vertical synchronizing pulse interval. Hence, the output of the integrating network 28, 30, appearing at the junction of resistor 28 and capacitor 30, will be as shown by the waveform 70*c* of FIG. 2. The width of portion 78 of waveform 70*c* is substantially equal to the total vertical synchronizing pulse interval of pulse train 70*a*. Resistors 18 and 20 are selected such that the DC voltage at their junction, and at the cathode of diode 32, is slightly positive and the portion 78 of waveform 70*c* is negative. As previously mentioned, the voltage level in the differentiating network path, and at the anode of diode 32, is always negative, so diode 32 is reverse biased except during the portion 78 of waveform 70*c***, that is, during the vertical synchronizing pulse interval.

Thus, diode 32 conducts in the presence of the integrated vertical synchronizing pulse and the waveform **70*c* is combined at terminal 36 with the pulses (waveform 70*b*) from the differentiating network 14, 24. The combined waveform appearing at the input terminal 36 of the amplifier 40 is shown in waveform 70*d* of FIG. 2. The effect of the combination of the differentiated and the integrated pulses is to produce an output pulse from amplifier 40 (see waveform 70*e***) following each horizontal synchronizing pulse but not during the vertical synchronizing or equalizing pulse intervals.

Resistor 26 and variable capacitor 34 partially integrate the differentiated pulses shown in waveform **70*b*. The effect of such integration is to alter the rise time of the trailing edges of the differentiated horizontal synchronizing pulses. The altered trailing edges of these pulses are shown by the dotted lines 75*a* in waveform 70*d* of FIG. 2. Capacitor 34 is much smaller than capacitor 30, so the effect of capacitor 34** on the integrated vertical synchronizing pulses is negligible.

Operational amplifier 40 serves as a level or amplitude detector for the combined waveform **70*d* appearing at its input terminal 36. Amplifier 40 is arranged to provide a nominal 10 volt output pulse with an input of a nominal value of 10 millivolts. The amplifier 40 typically includes provision for an input bias voltage. For example, a commercially available RCA model CA 3015 integrated-circuit operational amplifier provides the desired operating characteristics. An adjustable bias voltage obtained from the wiper arm 46 of variable resistor 44 is applied to bias voltage input terminal 38 of amplifier 40. The bias voltage is adjustable in the range of the peaks of the differentiated horizontal synchronizing pulses. Since it is desired to amplify only the peaks of the differentiated horizontal synchronizing pulses, the bias voltage appearing at bias terminal 38 is adjusted such that only the peaks of the differentiated horizontal synchronizing pulses exceed this level. The peaks of the differentiated equalizing pulses and vertical synchronizing pulse components fall below the bias voltage level and will not produce an output at terminal 52 of amplifier 40. The peaks of the differentiated horizontal synchronizing pulses typically are arranged at a nominal one-half volt above the bias voltage level and are of sufficient amplitude to drive amplifier 40 into saturation. A rectangular output pulse therefore is produced at terminal 52 following the trailing edge of each horizontal synchronizing pulse. The width of the output pulse is dependent upon the shape of waveform 75*a***.

The output of amplifier 40, appearing at output terminal 52, is a rectangular burst flag pulse 80, shown in waveform 70 of FIG. 2, delayed from the trailing edge of the horizontal synchronizing pulse. The amount of delay of pulse 80 from the trailing edge of the horizontal synchronizing pulse may be varied by adjusting capacitor 34 which alters the slope of the trailing edge of the horizontal synchronizing pulses. The width of the rectangular burst flag pulse 80 may be adjusted by varying the bias voltage applied to amplifier 40.

Figure 3:
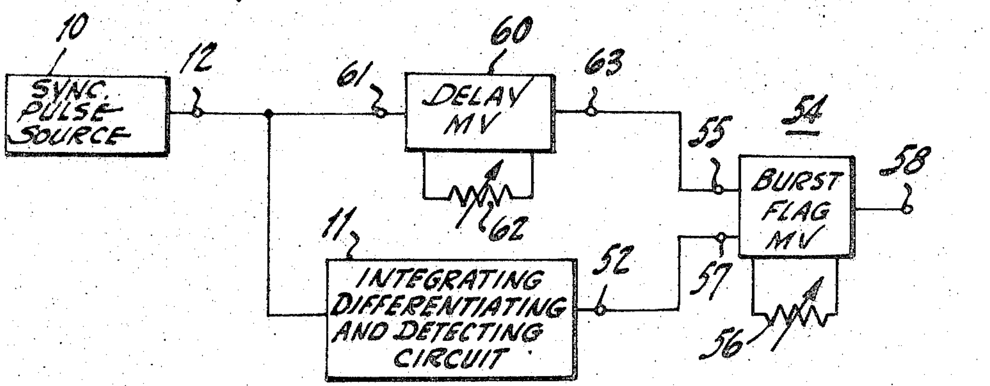
FIG. 3 is a block diagram of a second embodiment of the invention.

Another embodiment of the present invention is shown in FIG. 3. The arrangement in this embodiment produces a burst flag pulse which is delayed from the leading edge of the horizontal synchronizing pulses of the pulse train supplied by source 10. A pulse train, shown in waveform **70*a* of FIG. 2, is supplied by source 10 to input terminal 61 of delay multivibrator 60 and to input terminal 12 of circuit 11. Circuit 11 represents the circuit shown in FIG. 1 with the exception that capacitor 34 is omitted. The operation of the circuit 11 is the same as described with reference to FIG. 1 except that there is no provision to vary the delay of the rectangular pulse appearing at terminal 52 of circuit 11. A variable resistor 62 controls the pulse width of multivibrator 60. An output terminal 63 of multivibrator 60 is connected to an input terminal 55 of a burst flag multivibrator 54. The output terminal 52 of circuit 11 is connected to an inhibit terminal 57 of multivibrator 54. A variable resistor 56 controls the width of the burst flag pulse appearing at output terminal 58**.

Adjustment of variable resistor 62 varies the delay of the trailing edge of pulses produced by multivibrator 60. The trailing edge of such pulses trigger the burst flag multivibrator 54. The output appearing at terminal 52 (see explanation of FIG. 1) inhibits multivibrator 54 except when a pulse is present at terminal 52. An output pulse is produced at terminal 52 following each horizontal pulse, but no output pulse is produced during the equalizing or vertical synchronization pulse intervals. This is the same condition as described with reference to FIG. 1. Thus, multivibrator 54 is enabled only during intervals following the trailing edge of the horizontal synchronizing pulses. The trailing edge of the pulses produced by multivibrator 60 are applied to input 55 of multivibrator 54 at some time during the "enabled" period of multivibrator 54 (as determined by the adjustment of resistor 62). A burst flag pulse therefore is generated by multivibrator 54 at output terminal 58, the pulse being delayed from the leading edge of the horizontal synchronizing pulse and being of a duration determined by variable resistor 56.

What is claimed is:

1. Apparatus for deriving pulses from a pulse train including recurring first, second, and third pulses, said second pulses being wider than said first pulses and said third pulses being wider than said second pulses, said apparatus comprising:

an input terminal adapted to be connected to a source of said pulse train, a first output terminal, means coupled to said input terminal for differentiating said first, second, and third pulses, means coupled to said input terminal for integrating primarily said third pulses, means coupled to said integrating means and to said differentiating means for combining the pulses derived therefrom, delaying means coupled in circuit between said input terminal and said first output terminal for effectively delaying at least one of said first, second, and third pulses, and means coupled between said combining means and said first output terminal for detecting said differentiated second pulses and forming rectangular output pulses therefrom, said means also inhibiting said rectangular output pulses during the interval of said integrated third pulses.

2. Apparatus according to claim 1 wherein said means for detecting said differentiated second pulses includes an operational amplifier having input and output terminals for level-detecting said differentiated second pulses.

3. Apparatus according to claim 2 wherein said operational amplifier has a bias voltage input terminal adapted to be connected to a source of adjustable bias voltage, whereby an output pulse is derived from said operational amplifier only when said differentiated second pulses exceed the level of said bias voltage.

4. Apparatus according to claim 3 wherein said delaying means includes a capacitor connected between said combining means and a point of reference potential for altering the slope of the leading edges of said differentiated pulses whereby the delay between said second pulses and said rectangular pulses is determined.

5. Apparatus according to claim 3 wherein said delaying means includes a first multivibrator and said means for forming a rectangular pulse includes a second multivibrator, each of said multivibrators having input and output terminals, said first multivibrator having its input terminal connected to said pulse train input terminal and its output terminal connected to an input terminal of said second multivibrator, and said second multivibrator having its output terminal connected to said first output terminal.

6. Apparatus according to claim 5 wherein said second multivibrator has an inhibit input terminal connected to said output terminal of said operational amplifier, whereby there is an output obtained from said second multivibrator only when there is a pulse applied to said inhibit input terminal.

7. Apparatus according to claim 6 wherein each of said first and second multivibrators has an adjustable delay time, the delay time of said first multivibrator determining the delay between said second pulse and said rectangular output pulse, and the delay time of said second multivibrator determining the duration of said rectangular output pulse.

8. Pulse generating means comprising:

means for providing a train of pulses including first, second and third pulse components, said second pulse components being of greater duration than said first pulse components, and said third pulse components being of greater duration than said second pulse components;

means coupled to said pulse train providing means for differentiating said pulse components, means coupled to said pulse train providing means for integrating said pulse components, and means coupled to said differentiating and integrating means responsive jointly to differentiated and integrated pulse components for producing output pulses in timed relation with respect to said second pulse component.

9. Pulse generating means according to claim 8 wherein said jointly responsive means inhibits said output pulses during the interval of said third pulses.

10. Pulse generating means according to claim 9 wherein said jointly responsive means includes means for timing said output pulses from the trailing edge of said second pulses.

11. Pulse generating means according to claim 9 wherein said jointly responsive means includes means for timing said output pulses from the leading edge of said second pulses.

References Cited

UNITED STATES PATENTS 2,874,217 2/1959 Diehl ---------------- 178—69.5

STANLEY D. MILLER, Jr., Primary Examiner

U.S. Cl. X.R.

178—69.5; 307—229, 234, 235, 268; 328—127, 150